United States Patent
Padilla et al.

(10) Patent No.: US 12,333,959 B1
(45) Date of Patent: Jun. 17, 2025

(54) SYSTEMS AND METHODS FOR AUTOMATED ISSUE SPOTTING IN LEGAL DOCUMENTS AND PROVIDING EDUCATIONAL FEEDBACK

(71) Applicant: LegalMente AI, Inc., San Antonio, TX (US)

(72) Inventors: Jose Padilla, San Antonio, TX (US); Douglas Davila-Pestana, Orlando, FL (US)

(73) Assignee: LegalMente AI, Inc., San Antonio, TX (US)

( * ) Notice: Subject to any disclaimer, the term of this patent is extended or adjusted under 35 U.S.C. 154(b) by 0 days.

(21) Appl. No.: 18/534,801

(22) Filed: Dec. 11, 2023

(51) Int. Cl.
| G09B 5/02 | (2006.01) |
| G06F 40/284 | (2020.01) |
| G06Q 30/018 | (2023.01) |
| G06Q 50/18 | (2012.01) |
| G06Q 50/26 | (2012.01) |

(52) U.S. Cl.
CPC .............. *G09B 5/02* (2013.01); *G06F 40/284* (2020.01); *G06Q 30/018* (2013.01); *G06Q 50/18* (2013.01); *G06Q 50/265* (2013.01)

(58) Field of Classification Search
CPC ....................................................... G09B 5/02
See application file for complete search history.

(56) References Cited

U.S. PATENT DOCUMENTS

| 10,216,715 B2 | 2/2019 | Broderick et al. |
| 10,311,140 B1 | 6/2019 | Simonson et al. |
| 10,489,500 B2 | 11/2019 | Herr et al. |
| 10,515,149 B2 | 12/2019 | Herr et al. |
| 10,515,157 B2 | 12/2019 | Apanovitch et al. |
| 10,614,157 B1 | 4/2020 | Simonson et al. |
| 10,713,436 B2 | 7/2020 | Herr et al. |
| 10,824,797 B2 | 11/2020 | Herr et al. |
| 10,970,475 B2 | 4/2021 | Herr et al. |
| 11,093,697 B2 | 8/2021 | Herr et al. |
| 2020/0089743 A1* | 3/2020 | Herr ...................... G06F 40/197 |

FOREIGN PATENT DOCUMENTS

WO WO-2016051551 A1 * 4/2016 ........... G06F 16/332

* cited by examiner

*Primary Examiner* — Kesha Frisby
(74) *Attorney, Agent, or Firm* — Outlier Patent Attorneys, PLLC

(57) ABSTRACT

The present invention is for systems and methods for providing industry specific contract analysis in order to provide legal education associated with potential concerns with the provisions of said contract. Through the use of an AI model(s) trained to evaluate contracts documents from the same perspective as an experienced attorney would actually review such contracts, issues of varying significance can be identified and brought to the attention of parties, generally those lacking the legal expertise to spot such issues themselves.

20 Claims, 7 Drawing Sheets

SYSTEMS AND METHODS FOR AUTOMATED ISSUE SPOTTING IN LEGAL DOCUMENTS AND PROVIDING EDUCATIONAL FEEDBACK

CROSS-REFERENCE TO RELATED APPLICATIONS

None.

BACKGROUND

Field of Art

This invention is related to issue spotting potential legal concerns in contracts. More specifically, this invention is related to the review of legal agreements between multiple entities and identifying potential issues depending on entity type.

Background

Legal agreements can be difficult to understand for individuals lacking a law degree or an understanding of legal concepts. Moreover, given the complexity of legal agreements it may be unclear which sections are of most importance and/or are most likely to be relevant in the event of a contractual issue.

Obtaining a legal opinion of an agreement can be expensive as it is typical for attorneys to charge someone for their time spent reviewing a legal document. In some circumstances an individual may simply want to understand a legal document prior to signing it rather than needing or wanting to bear the expense of a full legal review and legal analysis (i.e. legal advice) of the agreement.

Furthermore, it may be difficult for an individual to obtain legal feedback in a timely manner as an attorney backlog may require several days of waiting for feedback which may not be acceptable to the individual as this could result in missed opportunities. Additionally, humans are prone to error and oversight and may fail to identify everything pertinent to a given user. This may be compounded by the size of the backlog resulting in less thorough review leading to missed identification of potential issues.

Some have attempted to automate the review of legal documents, however these approaches are generally directed to providing a service to those in the legal profession wherein documents are reviewed from a legal perspective and recommended edits are provided. This is of little to no benefit to the layperson who could still lack the expertise to understand the implications of the legal document.

Moreover, in attempting to automate the review of legal documents, a common approach is to use general purpose artificial intelligence (AI). This comes with drawbacks as a non-lawyer human user without legal experience likely wouldn't know what queries should be provided to the AI (i.e. what the AI should be prompted to look for). Furthermore, the general purpose AI would commonly be asked to review the entire document and broadly review the document from the perspective of standard or static legal principles as specified by legal rules or principles which may not align with what a practicing attorney would look for and the recommendations a practicing attorney would make.

SUMMARY

The present invention provides systems and methods for automated issue spotting in legal documents, in particular legal agreements between two or more parties. The invention comprises obtaining a review file associated with a legal document, performing a keyword analysis of the document, providing lines of interest to an artificial intelligence (AI) model, processing inferences from the AI model to identify potential issues and generating a modified document and/or user interface for providing feedback to the user associated with any identified potential issues. The feedback generally comprises educational information associated with what the potential issue is, the rationale behind why it is or could be an issue, and the consequences or obligations imposed by the legal agreement should aspects of the legal agreement be enforced in relation to the identified issue. In this way, users who do not have the legal background to interpret a legal agreement can be educated on important aspects of the legal agreement prior to seeking costly legal advice. Moreover, the invention provides for a timely review of a document (e.g. on the order of seconds or minutes) rather than requiring days of waiting for human review. In addition, through the use of AI-based systematic review, the invention avoids oversights and errors which may be associated with human-based review.

In one aspect, only lines of interest are saved to a data frame and sent to an AI model for inferencing which improves the functionality of the computer by reducing the computational resources required to analyze a document. As opposed to requiring AI inferencing of the whole document, analyzing select lines stored via the data frame improves the efficiency in obtaining AI inferences as opposed to methods which merely provide the entire document for AI inference analysis. These select "lines of interest" are chosen based on how an attorney actually reviews an agreement. Such lines can be written in many different ways, and AI is used to identify such lines even when written in differing styles.

The AI model employed in this invention is built to look for those things which are most important in real life based on the experience of an actual attorney, rather than looking at the whole document from a broader legal rules, standards or principles perspective. Also, in one aspect, the invention applies an industry specific model to evaluate documents from a more focused approach as it pertains to that industry. For example, in one aspect, the AI model is specific to healthcare and the review is based on the particularities of healthcare regulation and the realities of the healthcare industry, which differs from the methods employed by a lawyer without healthcare experience who would look at the same contract from a broader or different perspective. The invention also applies the same principles of specificity from industry to industry, to provide a focused review based on the particularities and realities of each industry. This specific AI utilizes specific concepts to analyze documents not found in other AI models presently.

For example, considering breach notification in a contract dealing with HIPAA law, one side wants to be notified immediately of a breach, the other side wants to be given as much time as possible to notify. Under healthcare regulations, one has a maximum of 60 days to notify the government (when necessary), while in reality, most parties agree to between a much lower number of days as the notification period for the contract. A general AI model based on standards or regulations may evaluate this aspect based on the 60 day requirement which is far from that used in practice and recommended by attorneys. This concept of utilizing real world principles in analysis is used in looking at other potential areas of legal concern (e.g., reviewing indemnification language, use of trade secrets in reviewing NDA, etc.) such that the AI model and associated invention described herein are able to offer improvements which general purpose AI approaches fall short or are simply unable to accurately spot issues similar to what a practicing attorney would.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION OF EMBODIMENTS

Figure 1:
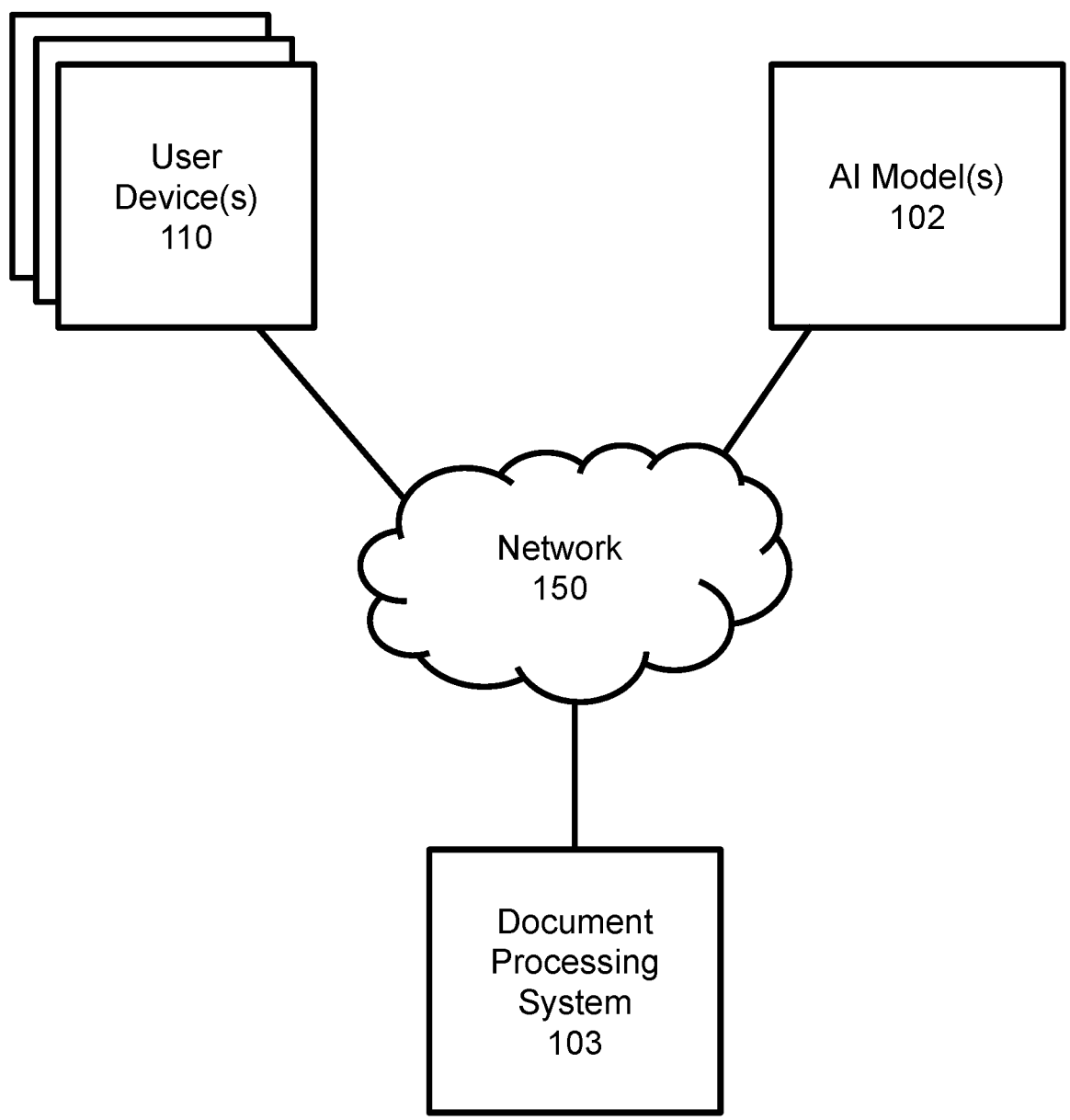
FIG. 1 illustrates an embodiment of a system for providing educational feedback associated with a review of a legal document according to an exemplary embodiment of the inventive disclosure.

The present invention provides systems and methods for automated issue spotting in legal documents, in particular legal agreements between two or more parties. The invention comprises obtaining a review file associated with a legal document, performing a keyword analysis of the document, providing lines of interest to an AI model, processing inferences from the AI model to identify potential issues and generating a modified document and/or user interface for providing feedback to the user associated with any identified potential issues. The review file is processed to extract lines of interest and save them to a data frame for later processing by the AI model. The feedback generally comprises educational information associated with what the potential issue is, the rationale behind why it is or could be an issue, and the consequences or obligations imposed by the legal agreement should aspects of the legal agreement be enforced in relation to the identified issue.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of a document review system according to one embodiment. The system includes user device(s) 110, document processing system 103, artificial intelligence (AI) model(s) 102, and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

Document processing system 103 is operable to obtain at least one review file, analyze the review file, and generate educational feedback associated with the review. The document processing system 103 is generally operable to review legal documents, in particular legal agreements between two or more parties such as, but not limited to, a business associate agreement, a non-disclosure agreement, a service agreement, a financing agreement, an employment agreement, a real estate agreement, and an intellectual property agreement. Document processing system 103 may obtain a review file associated with a legal document from at least one user device 110. Document processing system 103 may obtain a user label indicating a user's association with the legal document (e.g. which party of the document the user is associated with) or the perspective from which the document should be analyzed (e.g. as it pertains to a specified entity associated with the document). Document processing system 103 may identify lines of interest (e.g. based on a keyword search) and provide the lines of interest to an AI model(s) for analysis. Document processing system 103 may receive inferences from the AI model(s) and analyze the inferences to determine appropriate feedback to be provided to the user.

AI model(s) 102 are generally operable to receive text of interest from document processing system 103, apply at least one AI model to the received text and provide inferences as output to the document processing system 103. AI model(s) 102 may comprise at least one of natural language processing (NLP) and large language models (LLM) to analyze the received text.

User device(s) 110 generally comprise a computer or computing device operable to provide a review file, via network 150, to document processing system 103 and receive feedback regarding analysis of the review file. User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. Other databases and systems may be added or subtracted, as would be readily understood by a person of ordinary skill in the art, without departing from the scope of the invention.

Figure 2:
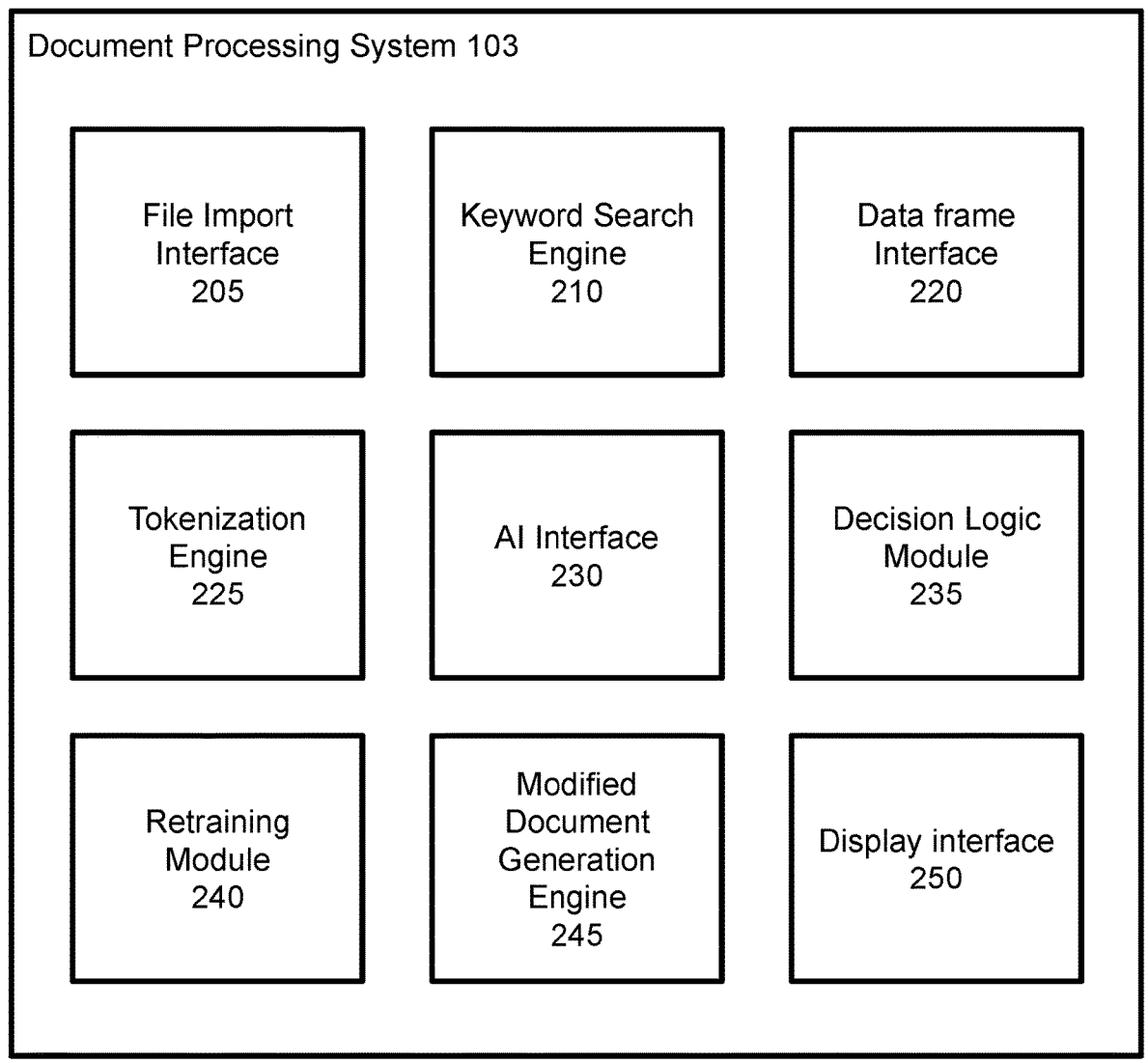
FIG. 2 illustrates an embodiment of a document processing system according to an exemplary embodiment of the inventive disclosure.

FIG. 2 illustrates an example computing environment in accordance with an exemplary embodiment of the present invention. The computing environment may comprise data processing system 103 comprised of file import interface 205, keyword search engine 210, keyword database interface 215, data frame interface 220, tokenization engine 225, artificial intelligence (AI) interface 230, decision logic module 235, retraining module 240, modified document generation engine 245, display interface 250. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

File import interface 205 is operable to receive at least one file for review by the processing system 103. The file import interface 205 may receive a review file comprising a legal document associated with first and second entities. The file import interface 205 may receive files in various formats, including but not limited to .pdf, .doc, .docx, .rtf, .txt, .odt, and .wpd formats. These are merely exemplary formats and other formats may be used without departing from the scope of the invention. The review file received via the file import interface 205 may comprise at least one type of contract, such as a business associate agreement (BAA), a non-disclosure agreement, a service agreement, a financing agreement, an employment agreement, a real estate agreement, and an intellectual property agreement. The file imported via the interface 205 may be associated with a first user label indicating an entity type of the user providing the file or the entity type for which the document should be evaluated. For example, in the context of a BAA, the first user label may indicate whether the user is, or whether the document should be evaluated from the perspective of, a business associate or a covered entity.

Keyword search engine 210 is operable to search the review file and locate text strings of interest within the review file. Keyword search engine 210 may identify at least one line of interest based on the identified text string of interest. A text string of interest may comprise at least one of a keyword(s) and a phrase of interest. Keyword search engine 210 may provide at least one of the identified text string and corresponding at least one line of interest for storage (e.g. in a data frame) and/or processing by an AI model.

Data frame interface 220 is operable to store relevant text strings and/or lines of interest from the keyword search in a data frame. Data frame interface 220 may comprise interfacing with other data storage approaches other than data frames as would be apparent to one of ordinary skill in the art without departing from the scope of the invention.

Tokenization engine 225 is operable to tokenize text strings and/or lines of interest in order to account for different wording of various phrases of interest. Tokenization engine 225 may perform at least one of N-gram tokenization and N-gram aggregation in identifying text strings and/or lines of interest in order to more accurately capture the relevant portions of the legal document. Tokenization engine 225 may filter the tokenized N-grams based on the first user label such that the tokenized phrases relevant to the user type can be allocated for review by an AI model.

AI interface 230 may interface with at least one AI model. AI interface 230 may provide at least one text string of interest and/or corresponding lines of interest to an AI model and receive at least one AI inference from the AI model. The AI model may comprise at least one language processing AI model. The language processing AI model may employ at least one of natural language processing (NLP) and large language models (LLM). The AI interface 230 may provide at least one data frame to an AI model. The AI interface 230 may receive, from at least one AI model, at least one inference associated with the provided text string of interest or line of interest.

Decision logic module 235 is operable to analyze the at least one AI inference received from the AI interface 230 and determine or generate at least one review output. The review output may comprise at least one of an alert, a recommendation, and guidance information. In general, the alert, recommendation and/or guidance information comprise identifying what the agreement covers (e.g. requirement, restrictions, allowances, etc.), provides the advantages/disadvantages associated with that coverage, and/or provides guidance and/or insight into what potential issues could arise in association with the coverage. In this way, the review output is educational in nature (as opposed to legal advice) and aids users in understanding the agreement under review. Decision logic module 235 is operable to analyze at least one AI inference based on the first user label. In this way the AI inference may be analyzed as it pertains to a given user type. As legal agreements may be associated with two or more parties (or entities), the implications of different legal clauses and language may be different for each party. Therefore, it is important to provide corresponding educational information as it pertains to the party type providing the document for review such that the user can be educated on the effects of different portions of the legal document being reviewed. Decision logic module 235 may comprise, although not depicted, a plurality of decision engines for processing AI inference data. For example, decision logic module 235 may comprise at least one of breach notification engine, permitted uses engine, term and termination engine, indemnification engine, HIPAA and HITECH references engine, and breach notification containing PHI (protected health information) engine.

Breach notification engine is operable to evaluate the AI inference and determine whether a timeframe associated with a breach notification clause satisfies an expected timeframe(s). Breach notification engine may compute a text similarity score in determining whether timeframe of a breach notification clause matches potential expected timeframes. The text similarity score may comprise at least one of Jaro-Winkler, Cosine, and Jaccard scores and/or an average of the Jaro-Winkler, Cosine, and Jaccard scores. When breach notification engine determines that a timeframe fails to meet an expected timeframe, at least one of an alert, a recommendation and guidance may be generated (e.g. pulled from a database) for display in association with the identified lines of interest in the document/review file. The breach notification engine may evaluate the timeframe based on the first user label such that a corresponding alert, recommendation, and/or guidance is directed towards educating the corresponding entity of the ramifications of the timeframe language. The breach notification engine may flag the corresponding line(s) of interest and/or associate them with the corresponding alert, recommendation, and/or guidance for later retrieval and display in a modified document user interface Permitted uses engine is operable to evaluate the AI inference and determine if permitted uses identified in the document meet expected use limitations. Permitted uses engine may determine if expected use limitations are met based on the first user label. For example, for a first user label it may be desirable that the permitted uses be more limiting while for a second user label it may be desirable that the permitted uses be less limiting. When expected use limitations are not met, permitted uses engine may generate an alert, recommendation, and/or guidance to educate the user of the ramifications of the corresponding language. For example, the alert, recommendation, and/or guidance may inform the user that one of the entities is entitled to at least one of a broader use (e.g. uses outside the scope of the agreement) or a narrower use (e.g. limited to uses within the scope of the agreement). For example, in the context of a BAA, a business associate may wish to engage in uses outside the scope of the agreement and understanding when such language prohibits or allows for such would be beneficial to the business associate understanding the implications of the agreement submitted for review. In this way, permitted uses engine may identify permitted uses, provide the advantages/disadvantages associated with those uses, and/or provide guidance and/or insight into what potential issues could arise in association with the permitted use clauses.

Term and termination engine is operable to evaluate the AI inference and determine if term and termination language identified in the document meet expected term and termination criteria. Term and termination engine may process AI inference to identify review output related to term and termination clauses. Review output generated by term and termination engine may comprise the language of interest (e.g. lines of interest) which pertain to term and termination clauses and present the language along with guidance regarding the language. For example, the guidance may comprise a suggestion that the entity evaluate the term and termination language of interest to ensure that it matches an underlying agreement between the two entities.

Indemnification engine is operable to evaluate the AI inference and determine if indemnification language identified in the document meets expected indemnification criteria. Indemnification engine may generate review output based on the first user label. For example, for a first entity type, the review output may comprise an indication that the first entity should consider whether they have protection from liabilities in the event of a violation, while for a second entity type the review output may comprise an indication that the first entity has protection from liabilities in the event of a violation and thus the second entity is made aware of such so they can make an educated decision regarding signing of the agreement.

Health Insurance Portability and Accountability Act (HIPAA) and Health Information Technology for Economic and Clinical Health (HITECH) references engine is operable to evaluate the AI inference and determine issues with HIPAA and HITECH references. In one aspect, HIPAA and HITECH references engine ensures the correct spelling of such references and generates review output indicating the correct spelling when incorrect spelling is identified.

Breach notification containing protected health information (PHI) engine is operable to evaluate the AI inference and determine review output as it pertains to circumstances where breach notifications associated with PHI. In one aspect, the review output comprises an indication as to whether or not there is a requirement to identify each individual whose information was breached. In this way, the user is provided with educational information as it pertains to requirements related to PHI when a breach occurs so that the user is provided of the obligations should the agreement be executed.

Retraining module 240 is operable to retrain at least one of the keyword search engine 210 and decision logic module 235. Retraining module 240 may retrain the keyword search engine 210 to improve text string of interest identification. Retraining module 240 may retrain decision logic module 235 to improve decision logic as it pertains to issue spotting within legal documents in order to better educate users as to the implications of certain aspects of the legal document. Retraining module 240 may perform retraining based on AI inference information received from one or more AI models.

Modified document generation engine 245 is operable to generate a modified document user interface (UI) for providing the reviewed legal document and any associated alerts, recommendations and/or guidance. Modified document generation engine 245 may generate a UI for displaying at least a portion of the reviewed legal document. The UI may comprise the ability to highlight the identified lines of interest. The UI may comprise an element for displaying the review output. Modified document generation engine 245 may associate the identified lines of interest or obtain such associations from a database such that the UI is enabled to display the corresponding review information for each identified line of interest.

Display interface 250 is operable to provide at least one of the modified document UI and the corresponding data such as a version of the document with lines of interest identified and the corresponding review output. Display interface 250 allows for the display of the UI showing a modified version of the document wherein the lines of interest are identified (e.g. highlighted) and corresponding review output is displayed such that a user can review and obtain a better understanding of what different portions of the legal document mean and what potential issues may be present if any and why they are considered potential issues.

Figure 3:
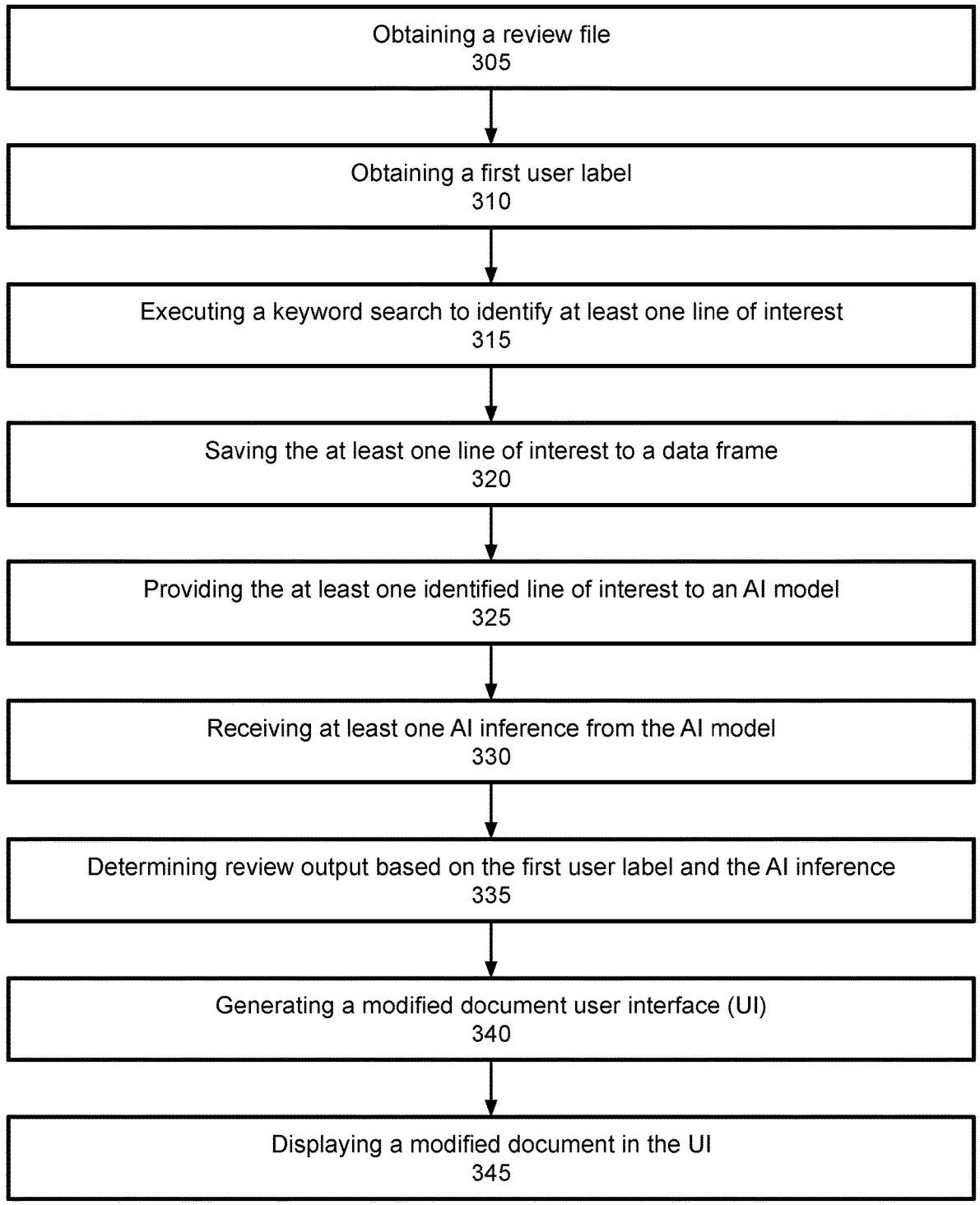
FIG. 3 illustrates an embodiment of a process for providing educational feedback associated with a review of a legal document according to an exemplary embodiment of the inventive disclosure.

FIG. 3 illustrates an exemplary process for automated issue spotting and making recommendations for educational purposes according to one embodiment of the invention. The process comprises obtaining a review file 305, obtaining a first user label 310, executing a keyword search to identify at least one line of interest 315, saving the at least one line of interest to a data frame 320, providing the at least one identified line of interest to an AI model 325, receiving at least one AI inference from the AI model 330, determining review output based on the first user label and the AI inference 335, generating a modified document user interface 340, and displaying a modified document in the user interface 345. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

At step 305, the process may comprise obtaining a review file. Obtaining a review file may comprise obtaining a digital file via at least one of file upload and file import. The review file may comprise a legal document associated with at least two entities (e.g. a first entity and a second entity). In one aspect, the legal document comprises a business associate agreement wherein one of the entities is a business associate and the other entity is a covered entity. In one aspect, the legal document comprises a non-disclosure agreement, a service agreement, a financing agreement, an employment agreement, a real estate agreement (e.g. lease agreements, purchase agreements), and intellectual property agreements (e.g. licensing agreements). These are merely exemplary, and the review file may comprise other legal documents as would be apparent to one of ordinary skill in the art.

At step 310, the process may comprise obtaining a first user label. The first user label may comprise an indication of which entity is providing the review file or from which entity perspective the review file should be analyzed. For example, in the scenario above where the review file is associated with a business associate agreement (BAA), the first user label provides an indication as to whether the review file should be analyzed as it pertains to or affects a covered entity and/or a business associate. The first user label may comprise other entities as would be apparent to one of ordinary skill in the art based on the review file or document type being analyzed.

At step 315, the process may comprise executing a keyword search to identify at least one line of interest. The keyword search may search for legal terms within the review file or associated legal document. The keyword search may search for specific legal terms depending on the type of legal document being reviewed. The keyword search may identify at least one text string within the document under review. The text string may comprise at least one of a word, a plurality of words, a phrase, and a plurality of phrases. Identifying at least one line of interest may comprise identifying one or more lines associated with the keyword(s). The at least one line of interest may comprise one or more lines before and/or after the identified line of interest associated with the keyword(s). In one aspect, the keyword search may be dependent on a given check being performed as part of the overall analysis. For example, one exemplary check associated with a BAA may comprise a breach notification check in which case the keyword search may be configured to identify text strings associated with different possible timeframes which may appear in the BAA in association with breach notification stipulations. In this scenario, the keyword search may be configured to identify phrases such as "1 business day", "one business day", and variations thereof as would be apparent to one of ordinary skill in the art such as phrases specifying a different number of days and/or a different wording for conveying the same or similar information. In one aspect, the keyword search may be configured based on the first user label such that text strings are identified as a function of an entity of interest (e.g. a business associate or covered entity). Other keyword searches as described above in association with FIG. 2 and the corresponding decision logic module and/or sub-engines may be employed as would be apparent to one of ordinary skill in the art.

At step 320, the process may comprise saving at least one line of interest to a data frame. One or more lines of interest as identified by the keyword search may be saved to a data frame for later processing. In one aspect, the data frame is structured such that it has a suitable configuration for providing at least one line of interest and/or associated information to an AI model. In one aspect, by saving only lines of interest to the data frame, the computational demands on the AI model can be reduced. In this way, the keyword search acts as a form of filtering of the review document such that only lines of interest are saved for analysis by the AI model thereby improving the efficiency in reviewing the document as compared to providing the whole document to the AI model for analysis. The use of a data frame is merely exemplary and other formats or approaches may be used to store at least one line of interest for subsequent analysis (e.g. by an AI model).

At step 325, the process may comprise providing the at least one identified line of interest to an AI model. Providing the at least one identified line of interest to an AI model may comprise providing the data frame to the AI model. The data frame may be provided to the AI model through various data communication or interface approaches, including but not limited to an application programming interface (API).

At step 330, the process may comprise receiving at least one AI inference from the AI model. The AI model may comprise at least one of a natural language processing (NLP) model and large language models (LLM) such that the inferences relate to a contextual understanding of at least one line of interest. The AI inference may be received from the AI model through various data communication or interface approaches, including but not limited to an application programming interface (API).

At step 335, the process may comprise determining review output based on the first user label and the AI inference. The review output generally comprises educational information associated with potential issues with legal aspects of the document being reviewed. The potential issues may be determined as a function of the first user label. Reviewing a document from the perspective of one entity may result in different potential issues than when reviewing the document from the perspective of a second entity wherein different issues may be identified and thus different educational information may need to be provided depending on the first user label. The review output may comprise at least one of an alert, a recommendation, and guidance information. The review output may comprise an explanation as to why an identified portion of the document presents an issue. For example, the review output may comprise at least one of an issue type, issue reason, potential resolutions, and potential consequences of the associated language such that a user is provided with educational information indicating what the issue is, why it is an issue, what may happen or be required of a party if the issue surfaces (e.g. if a clause of the contract is enforced). The review output may comprise at least one indicator of the language associated with an identified issue (e.g. the identified line of interest). For example, the review output may comprise highlighting of the corresponding text within the document where an issue has been identified. The review output may comprise a summary of one or more of the identified potential issues. The review output may comprise a summary of all the identified potential issues.

At step 340, the process may comprise generating a modified document user interface (UI). The modified document UI may comprise a UI element for displaying the reviewed document. The modified document UI may comprise a UI element for displaying at least a portion of the reviewed document wherein the portion of the reviewed document comprises at least the identified line(s) of interest associated with an identified issue. The modified document UI may comprise a display of the review output, for example displaying a summary the review output, or displaying the review output as an overlay or in an a UI element adjacent to the reviewed document. The modified document UI may comprise a UI element for indicating the location of one or more identified issues.

At step 345, the process may comprise displaying a modified document in the user interface. Displaying the modified document in the UI may comprise displaying at least a portion of the reviewed document in combination with the review output. Displaying may comprise displaying the reviewed document with portions of the document associated with identified issues being highlighted. Displaying may comprise displaying the review output for each identified issue along with the language at issue.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the enterprise system 101, the query wise stateless structure engine 110, the large language model (LLM) system 120, the network 150, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
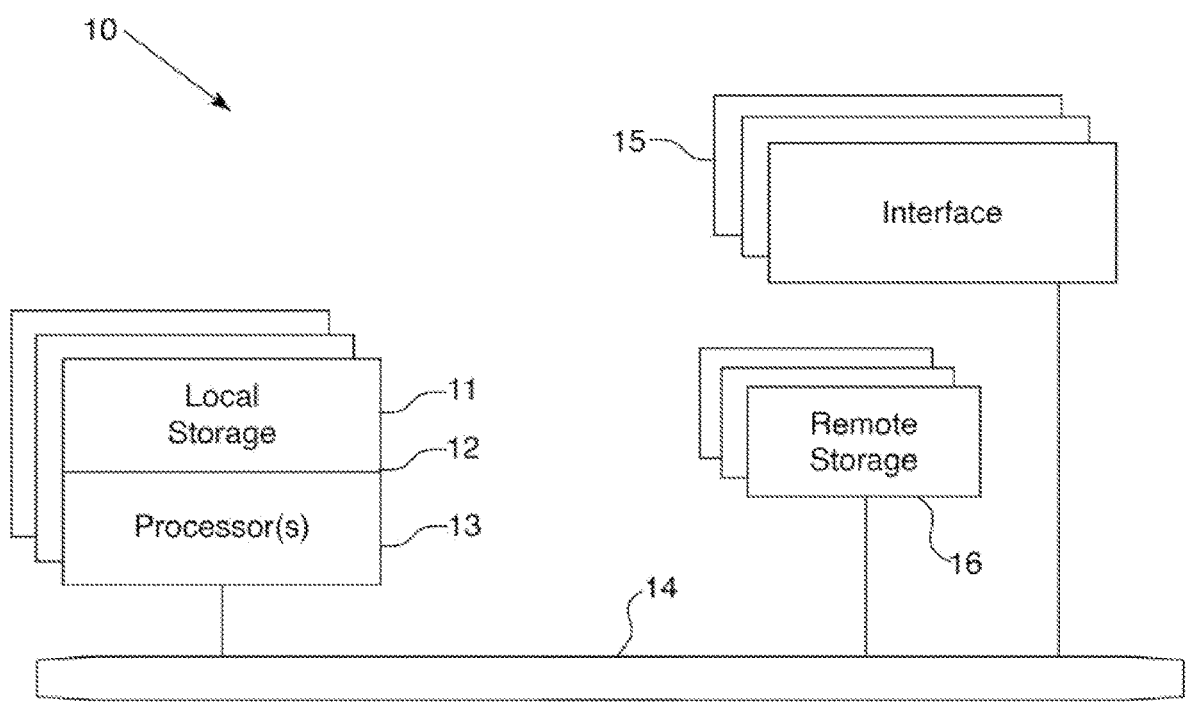
FIG. 4 illustrates an embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
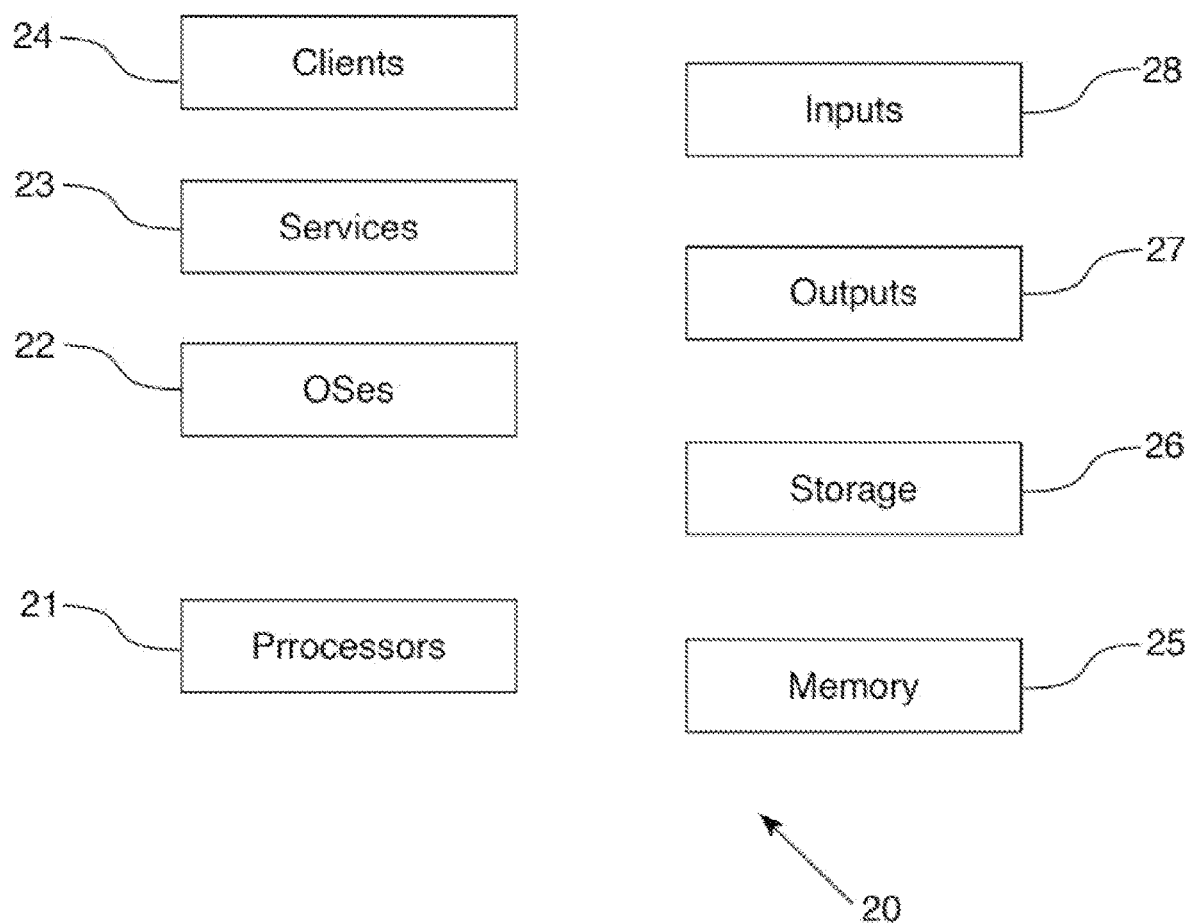
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
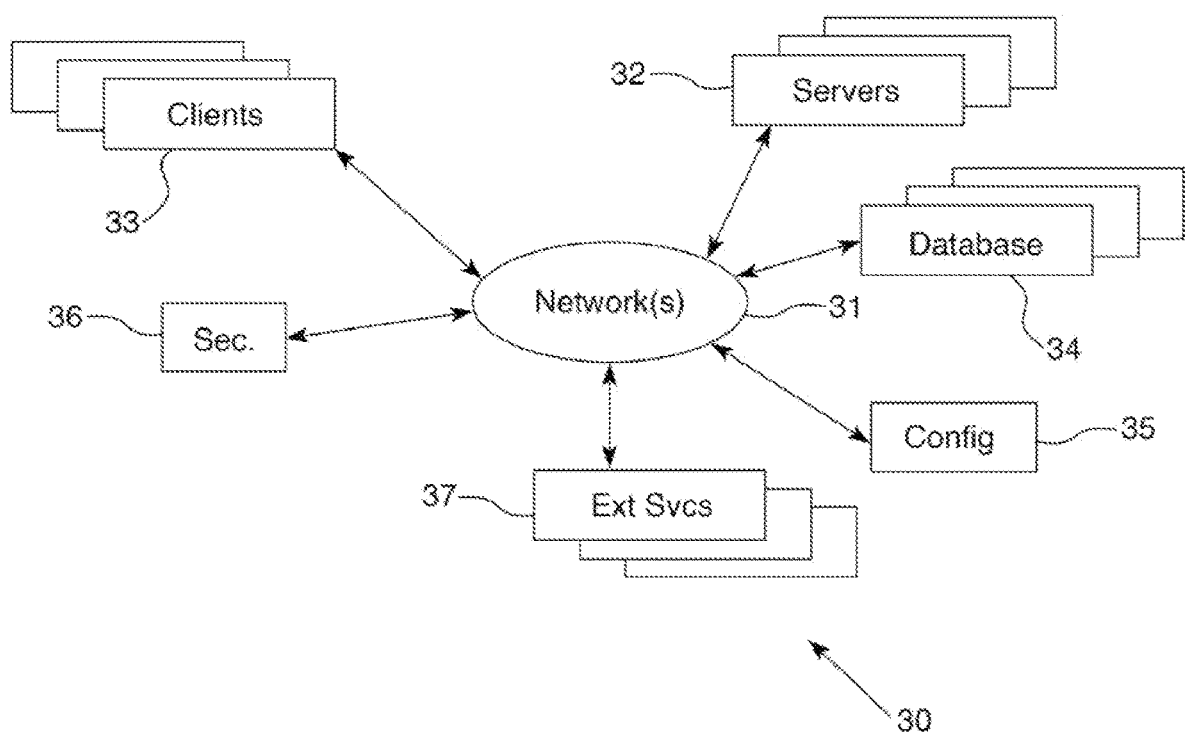
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
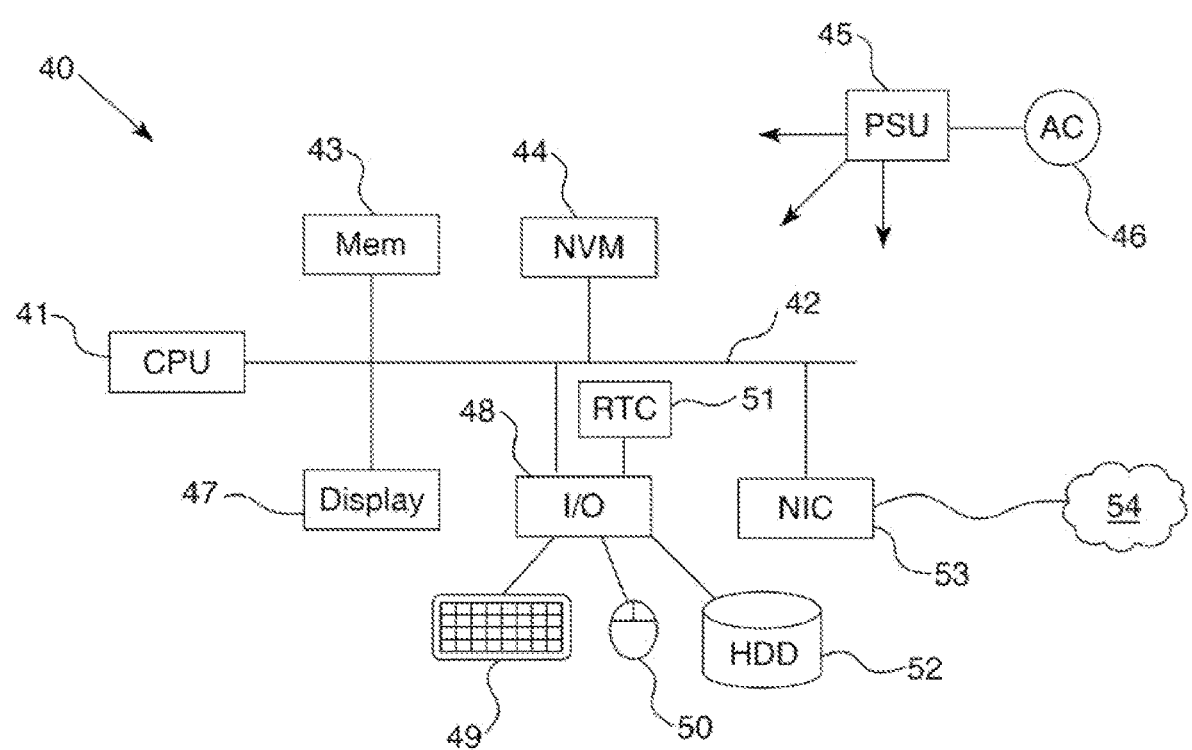
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for providing educational feedback associated with a review of a legal document, the method comprising:
  obtaining a review file from a user device associated with a first user, the review file comprising a legal document associated with a first entity and a second entity;
  obtaining a first user label, the first user label indicating whether the first user is associated with the first entity or the second entity;
  executing a keyword search to identify at least one line of interest within the review file, the keyword search identifying at least one text string, the text string comprising at least one of a keyword and a phrase of interest;

saving the at least one identified line of interest to a data frame;

providing the at least one saved data frame to an artificial intelligence (AI) model;

receiving at least one AI inference from the AI model, the AI inference generated by applying at least one of natural language processing (NLP) and large language models (LLM) to the at least one data frame;

determining, based on the first user label and the at least one AI inference, review output, the review output comprising at least one of an alert, a recommendation, and guidance information; and generating a modified document user interface (UI) element, the modified document UI element displaying at least a portion of the legal document and at least a portion of the review output.

2. The computer implemented method according to claim 1, further comprising tokenizing the at least one identified line of interest by applying an N-gram tokenization function;

filtering the tokenized n-grams to identify matches against at least one timeframe; and computing at least one text similarity score between the at least one timeframe and the tokenized line of interest.

3. The computer implemented method according to claim 2, wherein determining comprises determining a breach notification timeframe based on the text similarity score.

4. The computer implemented method according to claim 3, wherein the review output comprises an indication that an improper breach notification timeframe was identified.

5. The computer implemented method according to claim 1, wherein the keyword search identifies at least one text string associated with a permitted use clause, wherein the text string associated with a permitted use clause is evaluated based on the first user label to determine the presence of an issue with a permitted use clause.

6. The computer implemented method according to claim 5, wherein determining the presence of an issue with the permitted use clause comprises determining, for a first user label indicating the first user is a covered entity, that the permitted use clause fails to limit use to aspects identified in the legal document.

7. The computer implemented method according to claim 5, wherein determining the presence of an issue with the permitted use clause comprises determining, for a first user label indicating the first user is a business associate, that the permitted use clause limits the use to aspects identified in the legal document.

8. The computer implemented method according to claim 1, wherein the keyword search identifies at least one text string associated with term and termination and wherein the review output comprises a recommendation to the user that issues could arise if there is a discrepancy between the term and termination language of the legal document and an underlying agreement.

9. The computer implemented method according to claim 1, wherein the keyword search identifies at least one text string associated with indemnification, wherein the text string associated with indemnification is evaluated based on the first user label to determine the presence of an issue with indemnification.

10. The computer implemented method according to claim 9, wherein determining the presence of an issue with the indemnification clause comprises determining, for a first user label indicating the first user is a covered entity, that the indemnification clause is not present or fails to protect the covered entity from liabilities.

11. The computer implemented method according to claim 9, wherein determining the presence of an issue with the indemnification clause comprises determining, for a first user label indicating the first user is a business associate, that an indemnification clause is present which protects the covered entity from liabilities.

12. The computer implemented method according to claim 1, wherein the review output comprises an indication that in the event of a breach, whether there is an obligation to identify each individual whose information was breached.

13. The computer implemented method according to claim 1, wherein the modified document UI element displays a highlighted portion of the legal document of the review file.

14. The computer implemented method according to claim 1, wherein the legal document comprises at least one of a business associate agreement, a non-disclosure agreement, a service agreement, a financing agreement, an employment agreement, a real estate agreement, and an intellectual property agreement.

15. The computer implemented method according to claim 1, wherein the keyword search identifies at least one text string associated with at least one of a HIPAA reference and a HITECH reference, wherein determining comprises identifying an issue with the at least one of a HIPAA reference and a HITECH reference.

16. The method for providing a legal review according to claim 1, wherein the at least one of an alert, a recommendation, and guidance information are associated with at least one issue identified in the document and comprise educational information associated with potential problems which could arise as a result of the identified issue.

17. The method according to claim 1, wherein the modified document UI comprises:

a first sub element displaying at least one portion of the review file, and a second sub element displaying at least one inference associated with the document.

18. The method according to claim 17, wherein the second sub element comprises at least one of an issue type, issue reason, potential resolution, and potential consequences for the user.

19. A computing system for providing educational feedback associated with a review of a legal document, the computing system comprising:

at least one computing processor; and memory comprising instructions that, when executed by the at least one computing processor, enable the computing system to:

obtain a review file from a user device associated with a first user, the review file comprising a legal document associated with a first entity and a second entity;

obtain a first user label, the first user label indicating whether the first user is associated with the first entity or the second entity;

execute a keyword search to identify at least one line of interest within the review file, the keyword search identifying at least one text string, the text string comprising at least one of a keyword and a phrase of interest;

save the at least one identified line of interest to a data frame;

provide the at least one saved data frame to an artificial intelligence (AI) model;

receive at least one AI inference from the AI model, the AI inference generated by applying at least one of natural language processing (NLP) and large language models (LLM) to the at least one data frame;

determine, based on the first user label and the at least one AI inference, review output, the review output comprising at least one of an alert, a recommendation, and guidance information; and generate a modified document user interface (UI) element, the modified document UI element displaying at least a portion of the legal document and at least a portion of the review output.

20. A computer readable medium comprising instructions that when executed by a processor enable the processor to:

obtain a review file from a user device associated with a first user, the review file comprising a legal document associated with a first entity and a second entity;

obtain a first user label, the first user label indicating whether the first user is associated with the first entity or the second entity;

execute a keyword search to identify at least one line of interest within the review file, the keyword search identifying at least one text string, the text string comprising at least one of a keyword and a phrase of interest;

save the at least one identified line of interest to a data frame;

provide the at least one saved data frame to an artificial intelligence (AI) model;

receive at least one AI inference from the AI model, the AI inference generated by applying at least one of natural language processing (NLP) and large language models (LLM) to the at least one data frame;

determine, based on the first user label and the at least one AI inference, review output, the review output comprising at least one of an alert, a recommendation, and guidance information; and generate a modified document user interface (UI) element, the modified document UI element displaying at least a portion of the legal document and at least a portion of the review output.

* * * * *